United States Patent
Nagakoshi et al.

(10) Patent No.: US 8,570,595 B2
(45) Date of Patent: Oct. 29, 2013

(54) IMAGE PROCESSING APPARATUS, METHOD AND COMPUTER READABLE MEDIUM FOR READING AND OBTAINING A COMBINED IMAGE OF A DOCUMENT HAVING A SIZE LARGER THAN A READABLE DOCUMENT SIZE

(75) Inventors: Yasuhito Nagakoshi, Ishikawa (JP); Kiyoto Kosaka, Ishikawa (JP); Yuichi Okumura, Ishikawa (JP)

(73) Assignee: PFU Limited, Ishikawa (JP)

( * ) Notice: Subject to any disclaimer, the term of this patent is extended or adjusted under 35 U.S.C. 154(b) by 575 days.

(21) Appl. No.: 12/816,870

(22) Filed: Jun. 16, 2010

(65) Prior Publication Data

US 2011/0194127 A1 Aug. 11, 2011

(30) Foreign Application Priority Data

Feb. 10, 2010 (JP) .................................. 2010-028169

(51) Int. Cl.
*G06F 15/00* (2006.01)

(52) U.S. Cl.
USPC ........... 358/1.9; 358/538; 358/530; 358/1.12; 358/1.18; 358/453; 358/448; 358/474; 358/488; 358/505; 358/1.2; 358/1.17; 382/284; 382/275; 382/294; 382/318

(58) Field of Classification Search
None
See application file for complete search history.

(56) References Cited

U.S. PATENT DOCUMENTS

| | | | | |
|---|---|---|---|---|
| 5,465,163 A | * | 11/1995 | Yoshihara et al. | ............ 358/444 |
| 5,708,513 A | * | 1/1998 | Hasuo et al. | ............ 358/450 |
| 5,721,624 A | * | 2/1998 | Kumashiro et al. | ............ 358/450 |
| 6,549,681 B1 | * | 4/2003 | Takiguchi et al. | ............ 382/294 |
| 6,961,145 B2 | * | 11/2005 | Smith | ............ 358/1.2 |
| 6,975,434 B1 | * | 12/2005 | Pilu et al. | ............ 358/474 |
| 7,649,659 B2 | * | 1/2010 | Nabemoto et al. | ............ 358/538 |

FOREIGN PATENT DOCUMENTS

| | | |
|---|---|---|
| JP | 03-188575 A | 8/1991 |
| JP | 07-283933 A | 10/1995 |
| JP | 2000-227850 A | 8/2000 |
| JP | 2005-260387 A | 9/2005 |
| JP | 2007199886 A | 8/2007 |
| JP | 2009231856 | 10/2009 |

OTHER PUBLICATIONS

Office Action issued in corresponding Japanese application No. 2010-028169 dated Apr. 16, 2013.
Office Action mailed Jul. 9, 2013 corresponding to Japanese patent application No. 2010-028169.

* cited by examiner

*Primary Examiner* — Paul F Payer
(74) *Attorney, Agent, or Firm* — Lowe, Hauptman & Ham

(57) ABSTRACT

An image processing apparatus includes a control unit and an output unit. The control unit includes an image output unit that arranges an image read by reading processing in an area shifted in a certain direction in a display area in which read image on which reading processing is performed by an image reading apparatus is displayed, and outputs the image to the output unit.

9 Claims, 8 Drawing Sheets

IMAGE PROCESSING APPARATUS, METHOD AND COMPUTER READABLE MEDIUM FOR READING AND OBTAINING A COMBINED IMAGE OF A DOCUMENT HAVING A SIZE LARGER THAN A READABLE DOCUMENT SIZE

RELATED APPLICATION

The present application is based on, and claims priority from, Japanese Application Number 2010-028169, filed Feb. 10, 2010, the disclosure of which is hereby incorporated by reference herein in its entirety.

BACKGROUND OF THE INVENTION

1. Field of the Invention

The present invention relates to an image processing apparatus, an image processing method, and an image processing program for processing an image of a document read by an image reading apparatus (for example, a scanner, a copier, a facsimile).

2. Description of the Related Art

JP-A-2005-260387 discloses a technique related to an image processing apparatus and the like which correctly reads a document having a size larger than a readable document size by using a carrier sheet and obtains a combined image without setting processing of a read mode.

However, when A3 combining is performed by an image reading apparatus that can read one side of a document (specifically, when the A3 combining is performed by using the technique described in JP-A-2005-260387), there is a problem that how the image reading apparatus reads the document is difficult to understand for a user.

SUMMARY OF THE INVENTION

It is an object of the present invention to at least partially solve the problems in the conventional technology.

An image processing apparatus according to one aspect of the present invention includes a control unit and an output unit. The control unit includes an image output unit that arranges an image read by reading processing in an area shifted in a certain direction in a display area in which read image on which reading processing is performed by an image reading apparatus is displayed, and outputs the image to the output unit.

An image processing apparatus according to one aspect of the present invention includes a control unit and an output unit. The control unit includes a determining unit that, when a document on which reading processing is performed is read by an image reading apparatus along with a carrier sheet on which a mark is provided, determines which portion of the document is read on the basis of the mark in an image of the document, or a mark detecting unit that, when a document on which reading processing is performed is read by an image reading apparatus along with an identification mark, detects the identification mark from an image of the document, and a position detecting unit that, when the identification mark is detected by the mark detecting unit, determines which portion of the document is read from the image of the document. The control unit further includes a notification output unit that outputs notification information indicating a read position to be read next time to the output unit on the basis of the determining unit or the position detecting unit.

An image processing apparatus according to one aspect of the present invention includes a control unit, an output unit, and a storage unit that stores an image read by reading processing of an image reading apparatus. The control unit includes a read control unit that issues any one or both of an end instruction and a cancel instruction of the reading processing. When the image reading apparatus sequentially reads portions of a document, the read control unit discards an image read by the reading processing when the cancel instruction is issued, and stores an image read by the reading processing in the storage unit when the end instruction is issued.

An image processing method according to one aspect of the present invention is performed in a control unit of an image processing apparatus including the control unit and an output unit. The method includes an image output step of arranging an image read by reading processing in an area shifted in a certain direction in a display area in which read image on which reading processing is performed by an image reading apparatus is displayed and outputting the image to the output unit.

An image processing method according to one aspect of the present invention is performed in a control unit of an image processing apparatus including the control unit and an output unit. The method includes a determining step of, when a document on which reading processing is performed is read by an image reading apparatus along with a carrier sheet on which a mark is provided, determining which portion of the document is read on the basis of the mark in an image of the document, or a mark detecting step of, when a document on which reading processing is performed is read by an image reading apparatus along with an identification mark, detecting the identification mark from an image of the document, and a position detecting step of, when the identification mark is detected at the mark detecting step, determining which portion of the document is read from the image of the document. The method further includes a notification output step of outputting notification information indicating a read position to be read next time to the output unit on the basis of the determining step or the position detecting step.

An image processing method according to one aspect of the present invention is performed in a control unit of an image processing apparatus including the control unit, an output unit, and a storage unit that stores an image read by reading processing of an image reading apparatus. The method includes a read control step of issuing any one or both of an end instruction and a cancel instruction of the reading processing. When the image reading apparatus sequentially reads portions of a document, at the read control step, an image read by the reading processing is discarded when the cancel instruction is issued, and an image read by the reading processing is stored in the storage unit when the end instruction is issued.

An image processing program product according to one aspect of the present invention makes a control unit of an image processing apparatus including the control unit and an output unit execute an image processing method. The method includes an image output step of arranging an image read by reading processing in an area shifted in a certain direction in a display area in which read image on which reading processing is performed by an image reading apparatus is displayed and outputting the image to the output unit.

An image processing program product according to one aspect of the present invention makes a control unit of an image processing apparatus including the control unit and an output unit execute an image processing method. The method includes a determining step of, when a document on which reading processing is performed is read by an image reading apparatus along with a carrier sheet on which a mark is provided, determining which portion of the document is read on the basis of the mark in an image of the document, or a mark detecting step of, when a document on which reading processing is performed is read by an image reading apparatus along with an identification mark, detecting the identification mark from an image of the document, and a position detecting step of, when the identification mark is detected at the mark detecting step, determining which portion of the document is read from the image of the document. The method further includes a notification output step of outputting notification information indicating a read position to be read next time to the output unit on the basis of the determining step or the position detecting step.

An image processing program product according to one aspect of the present invention makes a control unit of an image processing apparatus including the control unit, an output unit, and a storage unit that stores an image read by reading processing of an image reading apparatus execute an image processing method. The method includes a read control step of issuing any one or both of an end instruction and a cancel instruction of the reading processing. When the image reading apparatus sequentially reads portions of a document, at the read control step, an image read by the reading processing is discarded when the cancel instruction is issued, and an image read by the reading processing is stored in the storage unit when the end instruction is issued.

a recording medium according to one aspect of the present invention includes the image processing program product described above.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of the image processing apparatus, the image processing method, and the image processing program according to the present invention will be explained in detail with reference to the drawings. Although, in the embodiment, a scanner which can read one side of a document is explained as an example of the image reading apparatus, the embodiment does not limit the present invention. In particular, the embodiment can be applied not only to a scanner which can read one side of a document, but also to a scanner which can read both sides of a document.

1. Configuration of the Embodiment

Figure 1:
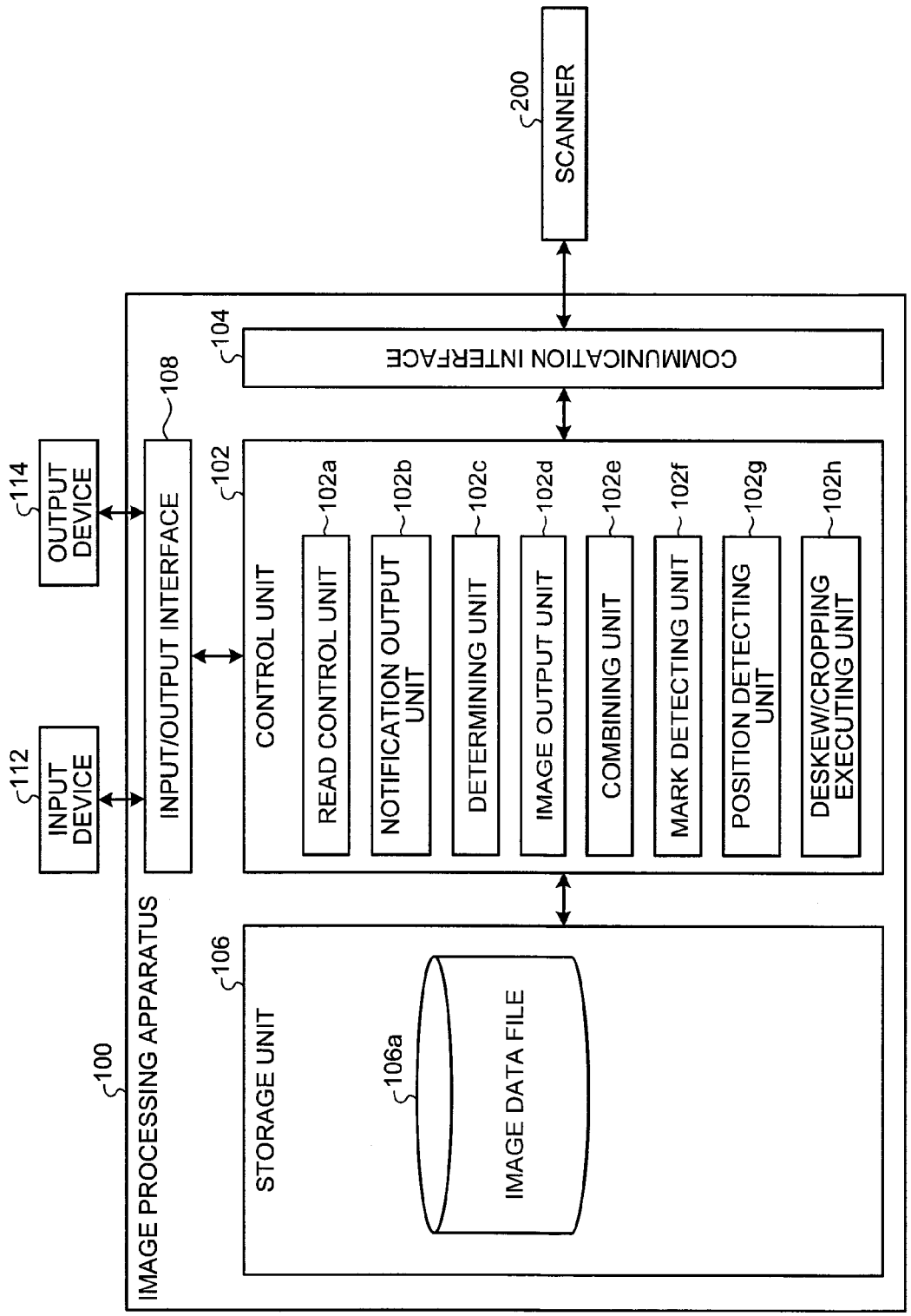
FIG. 1 is a block diagram showing an example of a configuration of an image processing apparatus 100.

A configuration of the image processing apparatus 100 according to the embodiment will be explained with reference to FIG. 1. FIG. 1 is a block diagram showing an example of the configuration of the image processing apparatus 100.

The image processing apparatus 100 is an information processing apparatus (personal computer) communicably connected to a scanner 200 which can read one side of a document. The image processing apparatus 100 includes a control unit 102, a communication interface 104, a storage unit 106, and an input/output interface 108, and these parts are communicably connected to each other via an arbitrary network path.

The communication interface 104 communicably connects the image processing apparatus 100 to the scanner 200 and other terminals via a communication device such as a router and a wired or wireless communication line such as a dedicated line. The communication interface 104 has a function to transmit/receive data to/from the scanner 200 and other terminals via the communication line. The communication interface 104 mediates communication between the image processing apparatus 100 and the scanner 200 or another terminal.

The storage unit 106 stores various databases, tables, and files. The storage unit 106 is a storage means. For example, a memory device such as RAM (Random Access Memory) and ROM (Read Only Memory), a fixed disk device such as a hard disk, a flexible disk, an optical disk can be used for the storage unit 106. In the storage unit 106, a computer program for providing commands to a central processing unit (CPU) to perform various processing in cooperation with an operating system (OS) is recorded. As shown in FIG. 1, the storage unit 106 stores an image data file 106a. The image data file 106a stores image data such as an image read by the scanner 200 (specifically, an image of a partial document which is a part of a document) and a combined image combined by a combining unit 102e described below.

The input/output interface 108 connects an input device 112 and an output device 114 to the image processing apparatus 100. Here, the output device 114 may include a speaker and a printer in addition to a monitor (including a home television set) (hereinafter, the output device 114 may be referred to as "monitor 114"). The input device 112 may include a monitor which realizes a pointing device function in corporation with a mouse, in addition to a keyboard, a mouse, and a microphone.

The control unit 102 includes a CPU that integrally controls the image processing apparatus 100. The control unit 102 has an internal memory that stores a control program such as the OS, a program that specifies various processing procedures or the like, and necessary data, and performs information processing that executes various processing based on these programs. As shown in FIG. 1, the control unit 102 mainly includes a read control unit 102a, a notification output unit 102b, a determining unit 102c, an image output unit 102d, the combining unit 102e, a mark detecting unit 102f, a position detecting unit 102g, and a deskew/cropping executing unit 102h.

The read control unit 102a causes the scanner 200 to start reading the document or a carrier sheet into which the document is inserted set in a shooter of the scanner 200, and obtains an image of a read portion of the document. The carrier sheet will be explained in detail in "2. Processing of the Embodiment" described below. The read control unit 102a performs any one or both of a cancellation and an end of reading processing of the document in the scanner 200. Specifically, when the scanner 200 sequentially reads portions of the document, if the read control unit 102a receives a notice that a Cancel button included in a document display screen is pressed, the read control unit 102a discards the image of the partial document having been received (the image read by the reading processing), and if the read control unit 102a receives a notice that an End button included in the document display screen is pressed, the read control unit 102a stores the image of the partial document having been received (the image read by the reading processing) in a predetermined storage area in the image data file 106a. The document display screen will be explained in detail in "2. Processing of the Embodiment" described below.

The notification output unit 102b outputs notification information that notifies an arrangement position of the partial document in the document to the output device 114. The notification output unit 102b outputs notification information that indicates a read position read by the reading processing or notification information that indicates the reading processing to be performed next time to the output device 114. The notification output unit 102b outputs notification information that indicates the read position to be read next time to the output device 114 on the basis of the determining unit 102c or the position detecting unit 102g described below. The notification output unit 102b outputs the notification information to the output device 114 according to a predetermined notification sequence of the arrangement positions. The notification output unit 102b outputs the notification information to the output device 114 while making the notification information recognizable on the document display screen. The notification sequence will be explained. For example, when a large-sized document is folded two times so that the vertical size and the horizontal size become a half of the original size respectively, four partial documents are formed from the document, and the arrangement positions of the partial documents in the document can be respectively defined as "upper-left", "upper-right", "lower-left", and "lower-right". Therefore, when folding the document as described above, by setting the notification sequence of the arrangement positions to be "from upper-left to upper-right to lower-left to lower-right" in advance, the notification output unit 102b notifies the arrangement positions in the sequence from "upper-left" to "upper-right" to "lower-left" to "lower-right" according to the set notification sequence. "Outputs notification information while making the notification information recognizable" means, for example, that a message (characters) notifying the arrangement position is displayed on the document display screen, an icon (graphics) notifying the arrangement position is displayed on the document display screen, an area on the document display screen corresponding to the arrangement position is blinked, and so on.

The determining unit 102c determines whether the carrier sheet is used on the basis of the image of the partial document obtained by the read control unit 102a. When the determining unit 102c determines that the carrier sheet is used, the determining unit 102c determines the arrangement position of the partial document (determines which portion of the document is read) on the basis of a mark in the image of the partial document.

The image output unit 102d arranges the image read by the reading processing in an area shifted in a certain direction in a display area in which a read image on which the reading processing is performed by the scanner 200 is displayed, and outputs the image to the output device 114. The image output unit 102d arranges the image read by reading processing next to the reading processing in a remaining area of the display area, and outputs the image to the output device 114. The image output unit 102d arranges the image of the partial document obtained by the read control unit 102a in an appropriate position in the document display screen (the arrangement position notified by the notification output unit 102b, the arrangement position determined by the determining unit 102c, a display position detected by the position detecting unit 102g) and outputs the image to the output device 114. The image output unit 102d arranges the combined image combined by the combining unit 102e described below in the entire document display screen, and outputs the combined image to the output device 114. When the determining unit 102c cannot detect the mark of the carrier sheet, the image output unit 102d arranges the image read by the reading processing in the entire display area, and outputs the image to the output device 114.

The combining unit 102e combines a plurality of partial document images to obtain the combined image thereof. The combining unit 102e combines the partial document images on which any one or both of deskew and cropping have been executed by the deskew/cropping executing unit 102h described below.

The mark detecting unit 102f detects an identification mark from the image of the partial document. Specifically, the mark detecting unit 102f detects whether there is a colored portion at the top of the image of the partial document and whether the portion is located higher than the edge of the document by detecting the edge of the document and determining color. The identification mark will be explained in detail in "2. Processing of the Embodiment" described below. The position detecting unit 102g detects the display position (area) of the partial document from the image of the partial document. When the mark detecting unit 102f can detect the identification mark, the position detecting unit 102g detects which portion of the document is read (detects the display position of the document in the image) from the image of the document. The deskew/cropping executing unit 102h detects the edges of the partial document on the basis of the display position detected by the position detecting unit 102g, and executes any one or both of the deskew and the cropping (including a cutting off of the identification mark) on the image of the partial document.

2. Processing of the Embodiment

Figure 7:
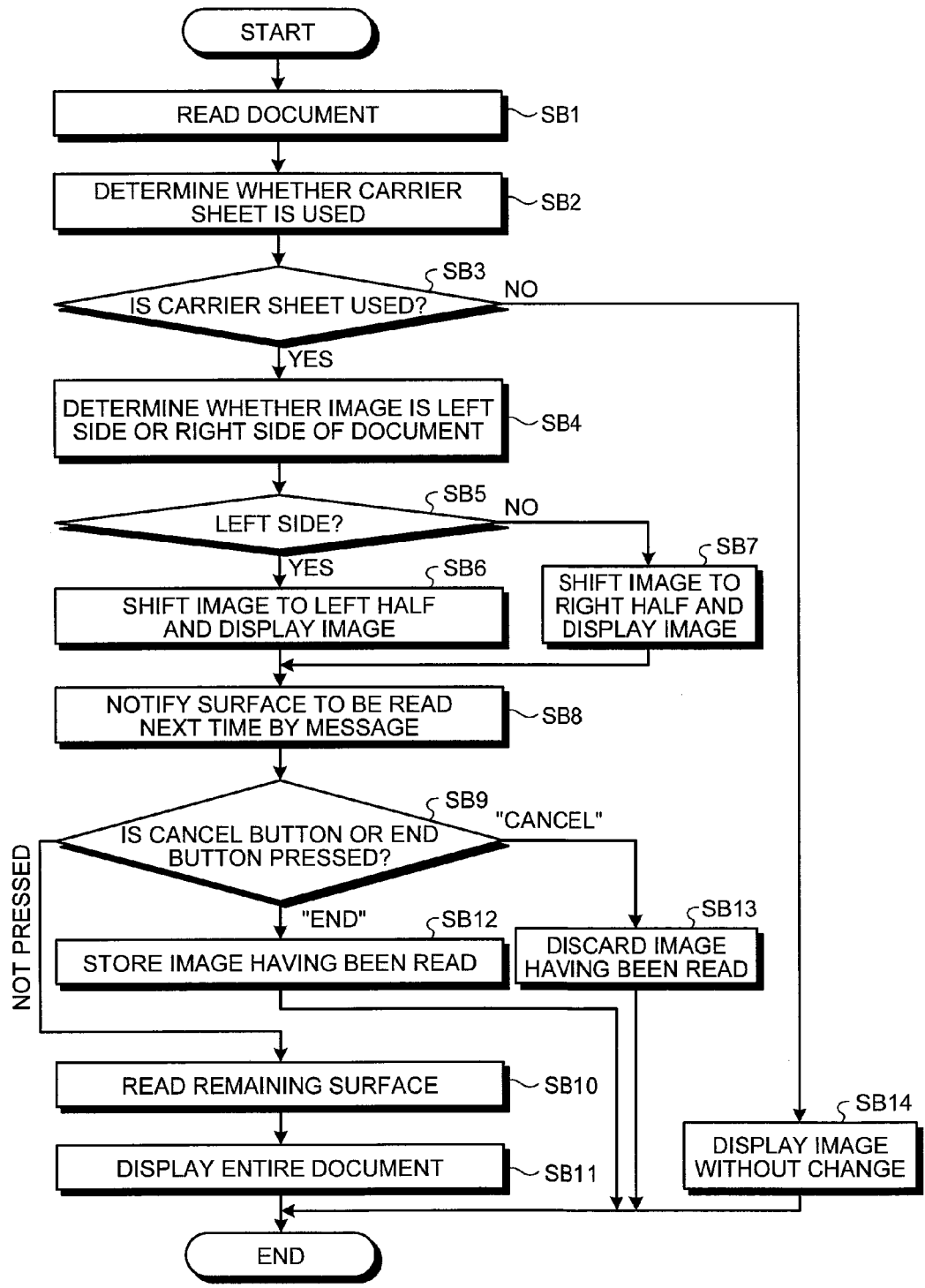
FIG. 7 is a flowchart showing an example of the main processing when using a carrier sheet.

An example of main processing performed by the image processing apparatus 100 having the above described configuration will be explained with reference to FIGS. 2, 7, and the like.

2-1. Main Processing (Normal)

First, an example of normal main processing will be explained with reference to FIG. 2 and the like. FIG. 2 is a flowchart showing an example of the normal main processing. In the explanation of the main processing, as an example, it is assumed that a large-sized document MA larger than a size readable by the scanner 200 is folded two times so that the vertical size and the horizontal size become a half of the original size respectively, and the notification sequence of the arrangement positions is set to "from upper-left to upper-right to lower-left to lower-right" in advance.

First, a user folds the document MA in half along the center line in the horizontal direction, and further folds the folded document MA by half along the center line in the vertical direction. As a result, the vertical size and the horizontal size of the document MA become a half of the original size respectively. In this way, four partial documents, which are an upper-left portion $MA_{TL}$, an upper-right portion $MA_{TR}$, a lower-left portion $MA_{BL}$, and a lower-right portion $MA_{BR}$, are formed from the document MA.

Then, the user sets the document MA on the shooter of the scanner 200 so that the upper-left portion $MA_{TL}$ will be read according to the arrangement position "upper-left" notified at first in the notification sequence set in advance, and operates the input device 112 to instruct the scanner 200 to start reading the document.

When receiving the instruction to start reading, the read control unit 102a causes the scanner 200 to start reading the document, and obtains the image (a partial image $MAI_1$) of the first partial document read by the scanner 200 from the scanner 200 (step SA1).

Figure 3:
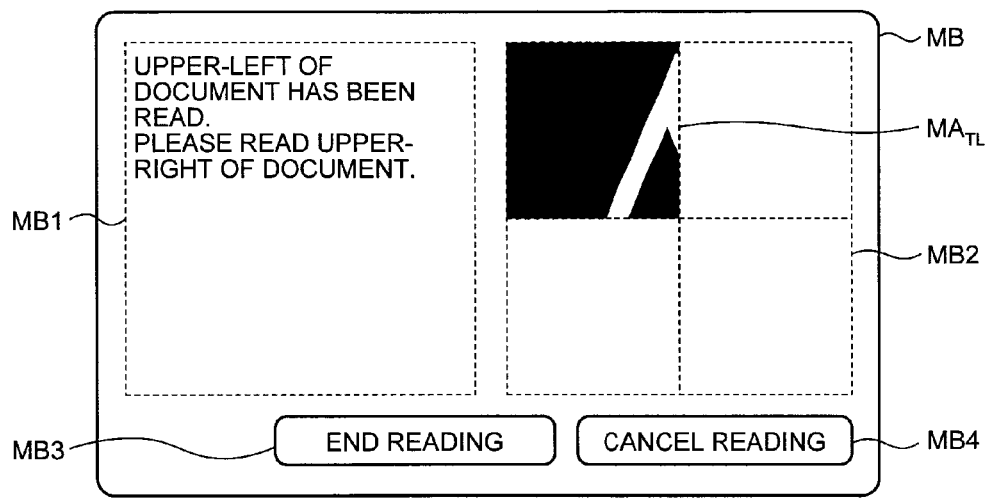
FIG. 3 is a diagram showing an example of a document display screen on which a partial image is displayed.

Next, the read control unit 102a checks whether all the partial documents of the document MA have been read by comparing the total number ("4" in the main processing) of the arrangement positions written in the notification sequence set in advance with the total number ("1" at this stage) of the partial images that have been obtained, and when the check result is not "All the partial documents have been read" (step SA2: No), the image output unit 102d determines that the partial image $MAI_1$ includes the upper-left portion $MA_{TL}$ according to the notification sequence set in advance, divides an image area MB2 of a document display screen MB into four areas as shown in FIG. 3, shifts the partial image $MAI_1$ into the upper-left area of the image area MB2 that has been divided into four areas, and displays the partial image $MAI_1$ on the monitor 114 (step SA3).

The document display screen MB will be explained with reference to FIG. 3. The document display screen MB includes a message area MB1 for displaying the message that notifies the arrangement position of the partial document having been read and the arrangement position of the partial document to be read next time, the image area MB2 for displaying images, an End button MB3 for selecting the end of reading, and a Cancel button MB4 for selecting the cancellation of reading. In the main processing, since the four arrangement positions written in the notification sequence set in advance are "upper-left", "upper-right", "lower-left", and "lower-right", the size of the area MB2 is a size in which two partial images having been obtained can be arranged in both the vertical direction and the horizontal direction respectively.

Return to the explanation of the main processing. As shown in FIG. 3, the notification output unit 102b arranges the message notifying that the upper-left portion $MA_{TL}$ has been read and the partial document to be read next time is the upper-right portion $MA_{TR}$ in the message area MB1, and displays the message on the monitor 114 (step SA4).

The user checks how the document MA is read by the scanner 200 on the document display screen MB. When the user desires to end the main processing, the user operates the input device 112 to press the End button MB3, and when the user desires to cancel the main processing, the user operates the input device 112 to press the Cancel button MB4. When the user desires to continue the main processing, the user resets the document MA on the shooter of the scanner 200 so that the portion to be read next time (the upper-right portion $MA_{TR}$ in FIG. 3) is read according to the message in the message area MB1.

When any of the End button MB3 and the Cancel button MB4 is not pressed (step SA5: not pressed), the read control unit 102a causes the scanner 200 to start reading the document, and obtains the image (a partial image $MAI_2$) of the second partial document read by the scanner 200 from the scanner 200 (step SA6). When the End button MB3 is pressed (step SA5: "End"), the read control unit 102a stores the partial image having been obtained in a predetermined storage area in the image data file 106a (step SA7), and when the Cancel button MB4 is pressed (step SA5: "Cancel"), the read control unit 102a discards the partial image having been obtained (step SA8).

The control unit 102 causes each processing unit to repeatedly perform the processing at step SA2 and the following steps. Specifically, since the four partial documents are formed from the document MA in the main processing as described above, step SA2 is repeated up to four times, and the processing from step SA3 to step SA6 is repeated up to three times.

Figure 4:
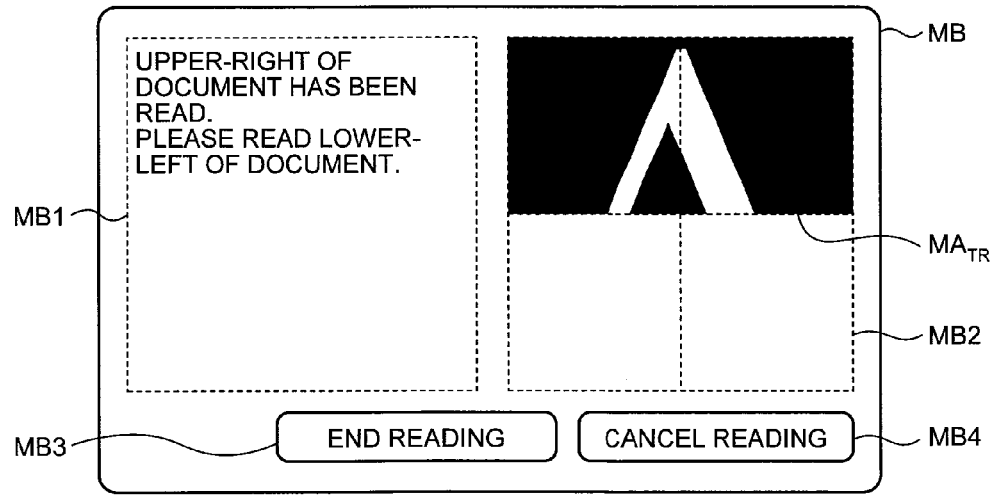
FIG. 4 is a diagram showing an example of the document display screen on which partial images are displayed.

Therefore, at step SA2 in the second cycle, the read control unit 102a compares the total number of the arrangement positions "4" with the total number of the partial images having been obtained (at this stage, "2"), and determines that not all the partial documents have been read. At step SA3 in the second cycle, the image output unit 102d determines that the partial image $MAI_2$ obtained at step SA6 in the first cycle includes the upper-right portion $MA_{TR}$, and shifts the partial image $MAI_2$ into the upper-right area of the image area MB2 as shown in FIG. 4, and displays the partial image $MAI_2$ on the monitor 114. At step SA4 in the second cycle, the notification output unit 102b arranges the message notifying that the upper-right portion $MA_{TR}$ has been read and the partial document to be read next time is the lower-left portion $MA_{BL}$ in the message area MB1 as shown in FIG. 4, and displays the message on the monitor 114. At step SA6 in the second cycle, when any of the End button MB3 and the Cancel button MB4 is not pressed (step SA5, not pressed), the read control unit 102a causes the scanner 200 to start reading the document, and obtains the image (a partial image $MAI_3$) of the third partial document read by the scanner 200 from the scanner 200.

Figure 5:
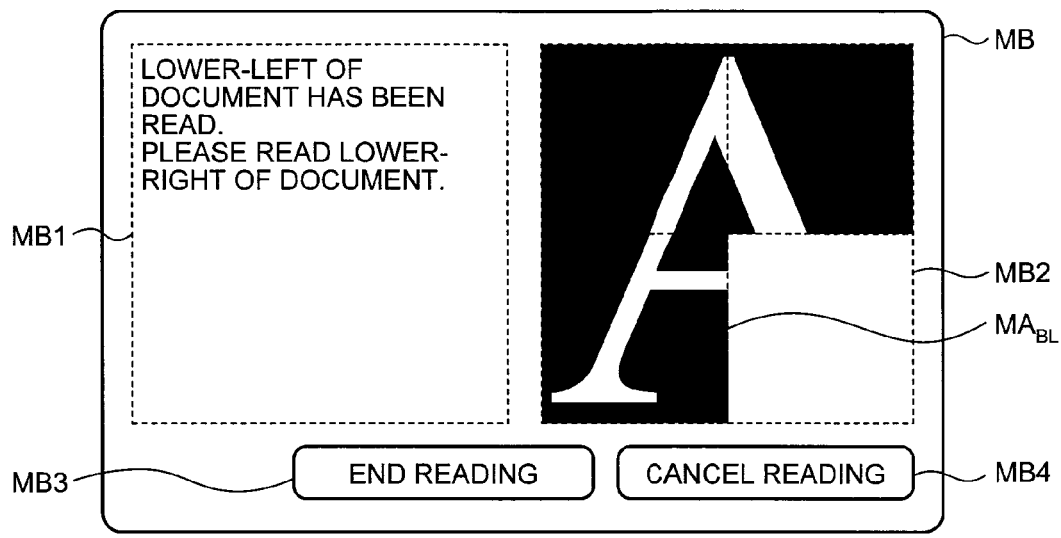
FIG. 5 is a diagram showing an example of the document display screen on which partial images are displayed.

Further, at step SA2 in the third cycle, the read control unit 102a compares the total number of the arrangement positions "4" with the total number of the partial images having been obtained (at this stage, "3"), and determines that not all the partial documents have been read. At step SA3 in the third cycle, the image output unit 102d determines that the partial image $MAI_3$ obtained at step SA6 in the second cycle includes the lower-left portion $MA_{BL}$, and shifts the partial image $MAI_3$ into the lower-left area of the image area MB2 as shown in FIG. 5, and displays the partial image $MAI_3$ on the monitor 114. At step SA4 in the third cycle, the notification output unit 102b arranges the message notifying that the lower-left portion $MA_{BL}$ has been read and the partial document to be read next time is the lower-right portion $MA_{BR}$ in the message area MB1 as shown in FIG. 5, and displays the message on the monitor 114. At step SA6 in the third cycle, when any of the End button MB3 and the Cancel button MB4 is not pressed (step SA5, not pressed), the read control unit 102a causes the scanner 200 to start reading the document, and obtains the image (a partial image $MAI_4$) of the fourth partial document read by the scanner 200 from the scanner 200.

At step SA2 in the fourth cycle, the read control unit 102a compares the total number of the arrangement positions "4"

with the total number of the partial images having been obtained (at this stage, "4"), and determines that all the partial documents have been read.

Figure 6:
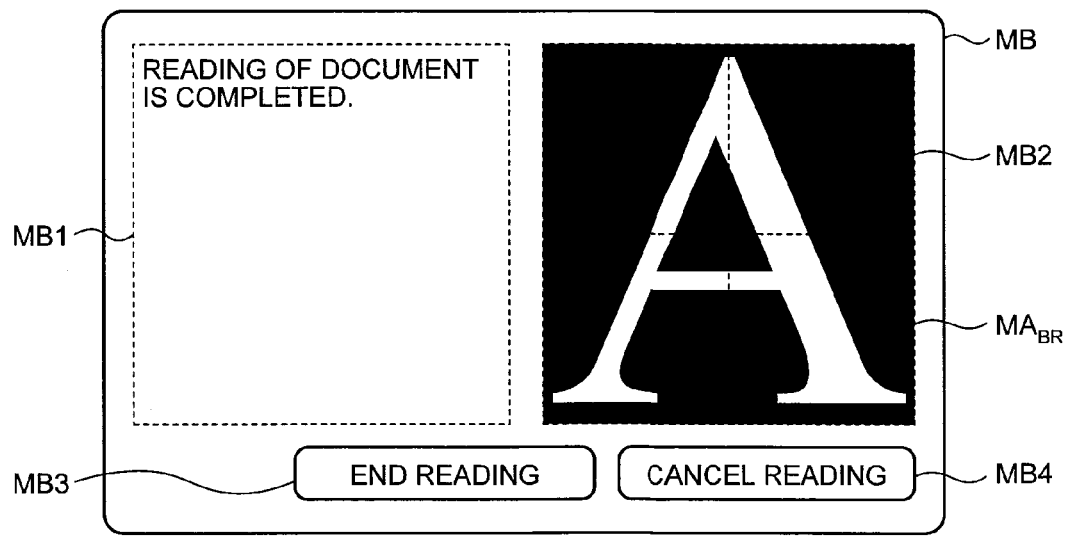
FIG. 6 is a diagram showing an example of the document display screen on which partial images are displayed.

Finally, when the determination result is "All the partial documents have been read" (step SA2: Yes), the image output unit 102d determines that the partial image MAI$_4$ obtained at step SA6 in the third cycle includes the lower-right portion MA$_{BR}$, and shifts the partial image MAI$_4$ into the lower-right area of the image area MB2 as shown in FIG. 6, and displays the partial image MAI$_4$ on the monitor 114 (step SA9). In this way, the entire document MA which is not folded is displayed. At step SA9, the combining unit 102e combines the partial images from MAI$_1$ to MAI$_4$ on the basis of respective arrangement positions, and generates a combined image MAI including the document MA which is not folded, and the image output unit 102d may display the combined image MAI in the entire area of the image area MB2. The combining processing of the partial images may also be performed in accordance with a flowchart shown in FIG. 12 described below.

Figure 2:
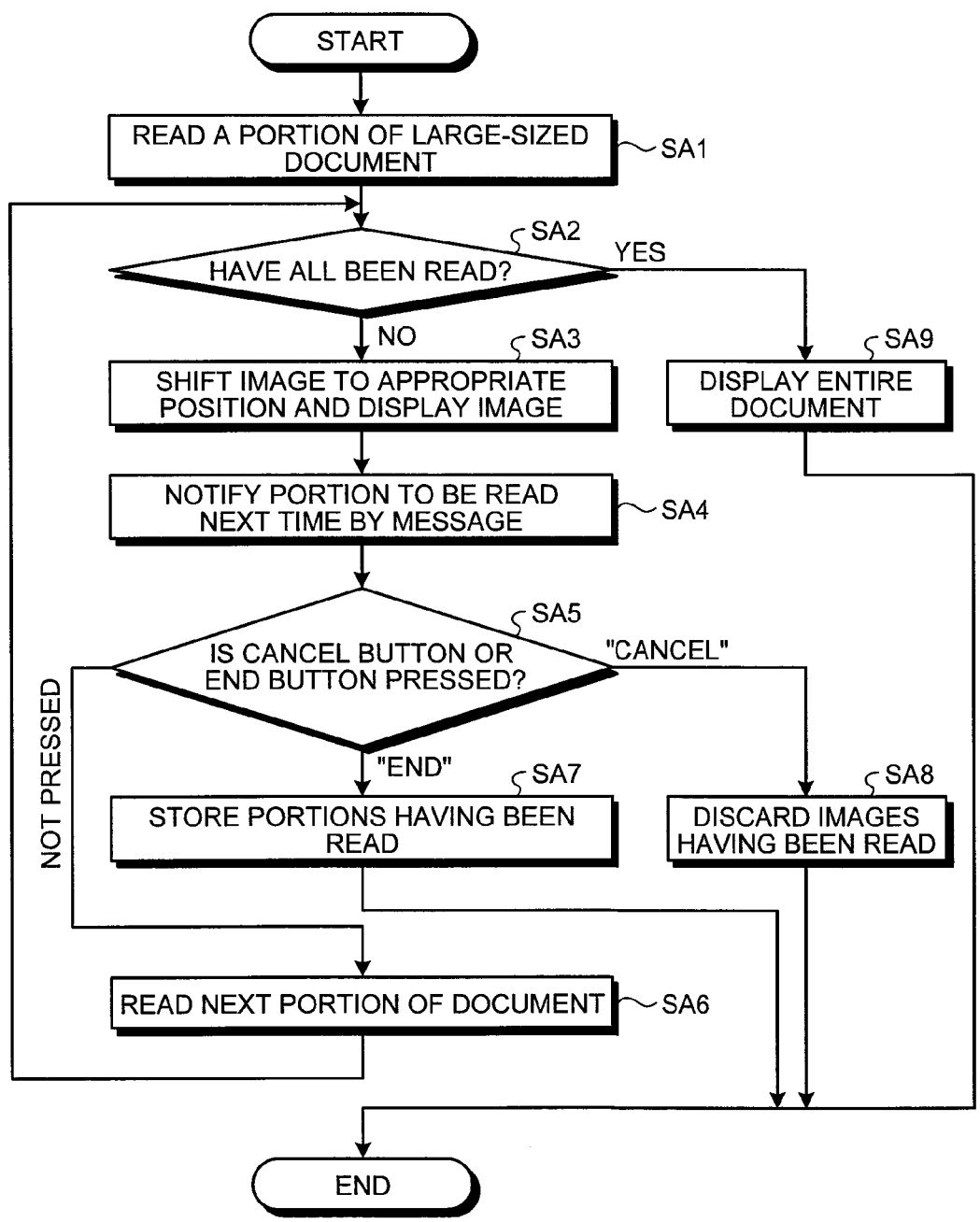
FIG. 2 is a flowchart showing an example of normal main processing.

The explanation of the normal main processing shown in FIG. 2 is completed. Although, in the explanation, an example in which the large-sized document MA is folded two times to form the four partial documents and the images of the four partial documents are respectively arranged in appropriate positions is explained, the number of folding times of the document MA and the number of the partial documents are not limited thereto, and any number is possible. By reading the document MA while the document MA is inserted into a carrier sheet MC described below, the determining unit 102c may determine a position of the fold line (junction line) between the partial documents and determine the arrangement positions of the partial documents. By reading the document MA while an identification mark MD described below is inserted into an appropriate position (for example, an edge side) of the document MA, the position detecting unit 102g may determine the fold line (junction line) between the partial documents and determine the arrangement positions of the partial documents. Although an example of the scanner which can read one side of a document is described here, for example, when reading an document which is folded two times and has a half size in both the vertical and horizontal directions by a scanner which can read both sides of a document, in the first reading (step SA1), two images of "upper-left" and "upper-right" are read and both images are arranged and displayed in appropriate positions at step SA3 (refer to FIG. 4), and in the last reading (step SA6), two images of "lower-left" and "lower-right" are read and both images are arranged and displayed in appropriate positions at step SA9 (refer to FIG. 6).

2-2. Main Processing (Example When Using A3 Carrier Sheet)

Next, an example of the main processing when using an A3 carrier sheet will be explained with reference to FIG. 7 and the like. FIG. 7 is a flowchart showing the example of the main processing when using the A3 carrier sheet.

Figure 8:
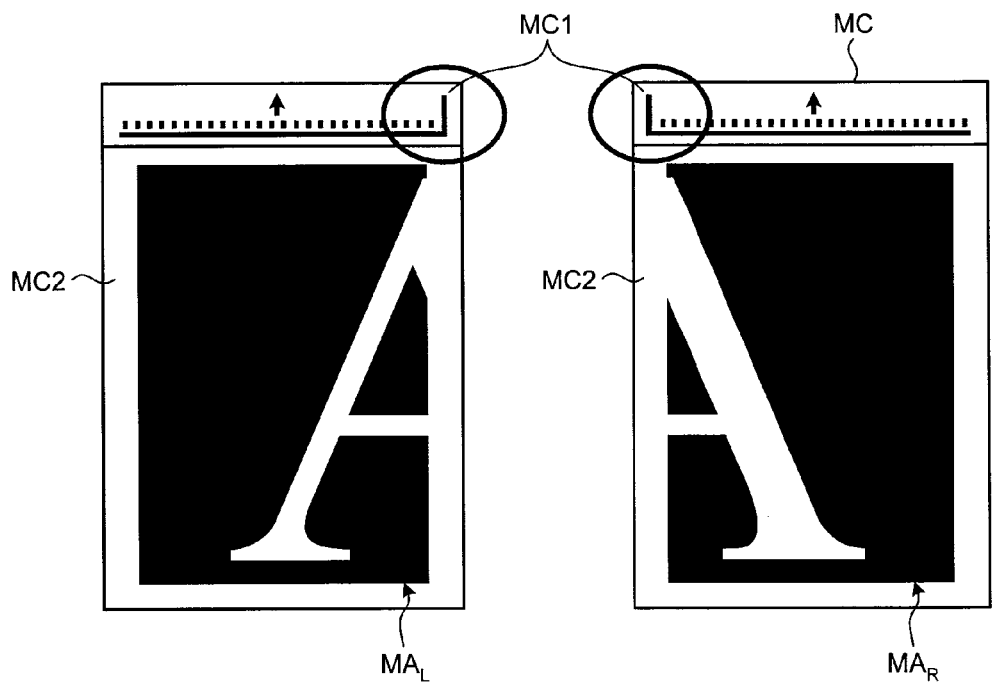
FIG. 8 is a diagram showing an example of the carrier sheet.

First, a user folds an A3-sized document MA in half along the center line. In this way, two partial documents, which are a left portion MA$_L$ and a right portion MA$_R$, are formed from the document MA. Then, the user inserts the document MA, which is folded, into the carrier sheet MC shown in FIG. 8. An example of the carrier sheet MC will be explained with reference to FIG. 8. The carrier sheet MC includes a mark MC1 for determining the position of the fold line (junction line) and a colorless transparent pair of sheets MC2 for sandwiching the document MA. As shown in FIG. 8, the user inserts the document MA between the sheets MC2 so that the fold line at the top edge of the document MA corresponds to the mark MC1.

Then, the user sets the carrier sheet MC on the shooter of the scanner 200 so that the left portion MA$_L$ (or the right portion MA$_R$) will be read, and operates the input device 112 to instruct the scanner 200 to start reading the document.

When receiving the instruction to start reading, the read control unit 102a causes the scanner 200 to start reading the document, and obtains a sheet image MCI$_1$ of the carrier sheet MC read by the scanner 200 from the scanner 200 (step SB1).

The determining unit 102c detects the mark MC1 from the sheet image MCI$_1$ obtained at step SB1, and when the mark MC1 is detected, the determining unit 102c determines that the carrier sheet MC is used, and when the mark MC1 is not detected, the determining unit 102c determines that the carrier sheet MC is not used (step SB2).

Next, when the determining unit 102c determines that the carrier sheet MC is used at step SB2 (step SB3: Yes), if the display position of the mark MC1 is on the right side of the sheet image MCI$_1$, the determining unit 102c determines that the sheet image MCI$_1$ includes the left portion MA$_L$, and if the display position of the mark MC1 is on the left side of the sheet image MCI$_1$, the determining unit 102c determines that the sheet image MCI$_1$ includes the right portion MA$_R$ (step SB4).

Figure 9:
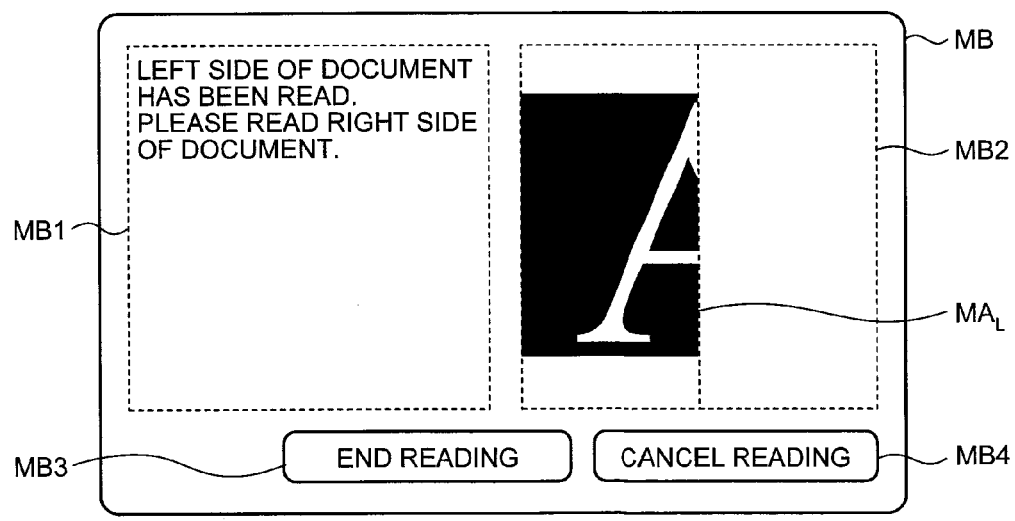
FIG. 9 is a diagram showing an example of the document display screen on which a partial image is displayed.

Next, when the determining unit 102c determines that the sheet image MCI$_1$ includes the left portion MA$_L$ at step SB4 (step SB5: Yes), the image output unit 102d divides the image area MB2 into two areas, shifts the sheet image MCI$_1$ into the left half of the image area MB2, and displays the sheet image MCI$_1$ on the monitor 114 as shown in FIG. 9 (step SB6), and when the determining unit 102c determines that the sheet image MCI$_1$ does not include the left portion MA$_L$ at step SB4 (step SB5: No), the image output unit 102d shifts the sheet image MCI$_1$ into the right half of the image area MB2, and displays the sheet image MCI$_1$ on the monitor 114 (step SB7).

Next, (1) when the determining unit 102c determines that the sheet image MCI$_1$ includes the left portion MA$_L$ at step SB4, the notification output unit 102b displays the message notifying that the left portion MA$_L$ has been read and the partial document to be read next time is the right portion MA$_R$ in the message area MB1 as shown in FIG. 9, and (2) when the determining unit 102c determines that the sheet image MCI$_1$ does not include the left portion MA$_L$ at step SB4, the notification output unit 102b displays the message notifying that the right portion MA$_R$ has been read and the partial document to be read next time is the left portion MA$_L$ in the message area MB1 (step SB8).

The user checks how the document MA is read by the scanner 200 on the document display screen MB. When the user desires to end the main processing, the user operates the input device 112 to press the End button MB3, and when the user desires to cancel the main processing, the user operates the input device 112 to press the Cancel button MB4. When the user desires to continue the main processing, the user reverses the carrier sheet MC and resets the carrier sheet MC on the shooter of the scanner 200 so that the portion to be read next time (the right portion MA$_R$ in FIG. 9) is read according to the message in the message area MB1.

When any of the End button MB3 and the Cancel button MB4 is not pressed (step SB9, not pressed), the read control unit 102a causes the scanner 200 to start reading the document, and obtains a sheet image MCI$_2$ of the carrier sheet MC read by the scanner 200 from the scanner 200 (step SB10).

Figure 10:
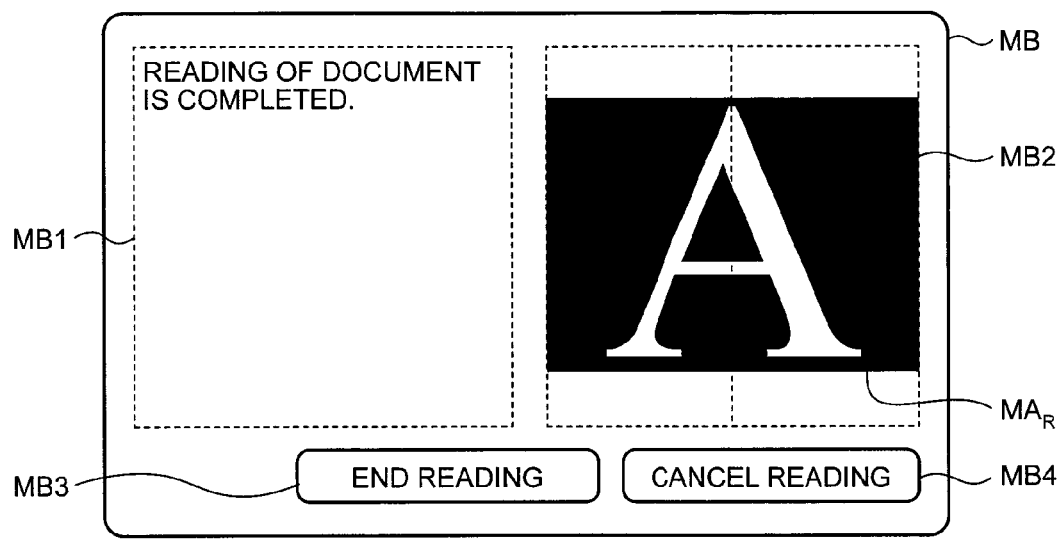
FIG. 10 is a diagram showing an example of the document display screen on which partial images are displayed.

Next, as shown in FIG. 10, the image output unit 102d shifts the sheet image MCI$_2$ obtained at step SB10 to the arrangement position corresponding to the portion to be read next time (here, the right half) notified in the message area MB1 and displays the sheet image $MCI_2$ on the monitor 114 (step SB11). In this way, the entire document MA which is not folded is displayed. Here, at step SB11, the combining unit 102e combines the sheet image $MCI_1$ and the sheet image $MCI_2$ while the edge on the side of the mark MC1 is used as the junction line, and generates a combined image MCI including the document MA which is not folded, and the image output unit 102d may display the combined image MCI in the entire area of the image area MB2.

When the End button MB3 is pressed (step SB9: "End"), the read control unit 102a stores the sheet image $MCI_1$ obtained at step SB1 in a predetermined storage area in the image data file 106a (step SB12), and when the Cancel button MB4 is pressed (step SB9: "Cancel"), the read control unit 102a discards the sheet image $MCI_1$ obtained at step SB1 (step SB13).

When the carrier sheet MC is determined not to be used at step SB2 (step SB3: No), the image output unit 102d does not divide the image area MB2, but arranges the sheet image $MCI_1$ in the entire image area MB2 and displays the sheet image $MCI_1$ on the monitor 114 (step SB14).

Figure 11:
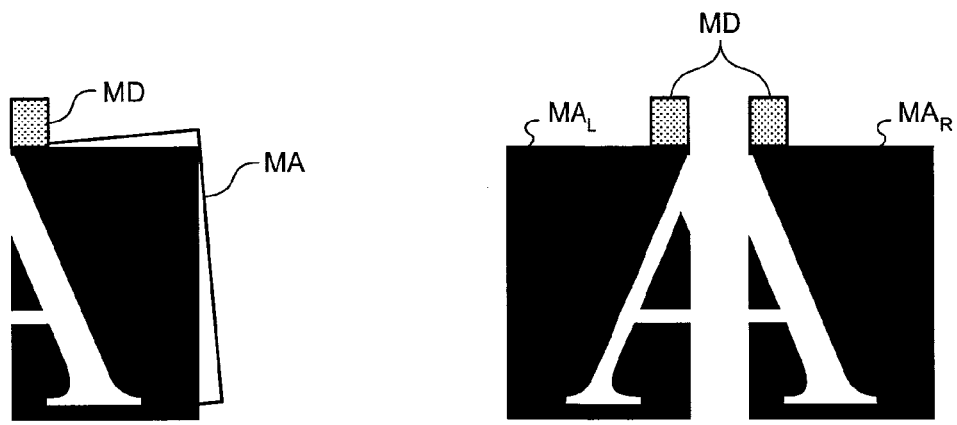
FIG. 11 is a diagram showing an example of identification marks.

The explanation of the main processing when using the A3 carrier sheet is completed. Although the main processing when using the A3 carrier sheet is an example when using the carrier sheet MC shown in FIG. 8, instead of the carrier sheet MC, it is possible to use, for example, the strip-shaped identification mark MD (for example, a sticky note such as a Post-it (registered trademark), a bookmark, a tag label, and the like) as shown in FIG. 11 to which color and pattern are applied. When using the identification mark MD, as shown in FIG. 11, a user may insert the identification mark MD between the document, which is folded, at the top edge along the fold line, and set the document MA sandwiching the identification mark MD on the shooter of the scanner 200. As shown in FIG. 11, when inserting the identification mark MD into the document MA at the top edge along the fold line, a direction of the fold line of the document, or the arrangement position of the document can be automatically detected by the position detecting unit 102g using the identification mark MD.

An orientation of the document included in the partial image may be, for example, reversed by using optical character recognition (OCR).

Figure 12:
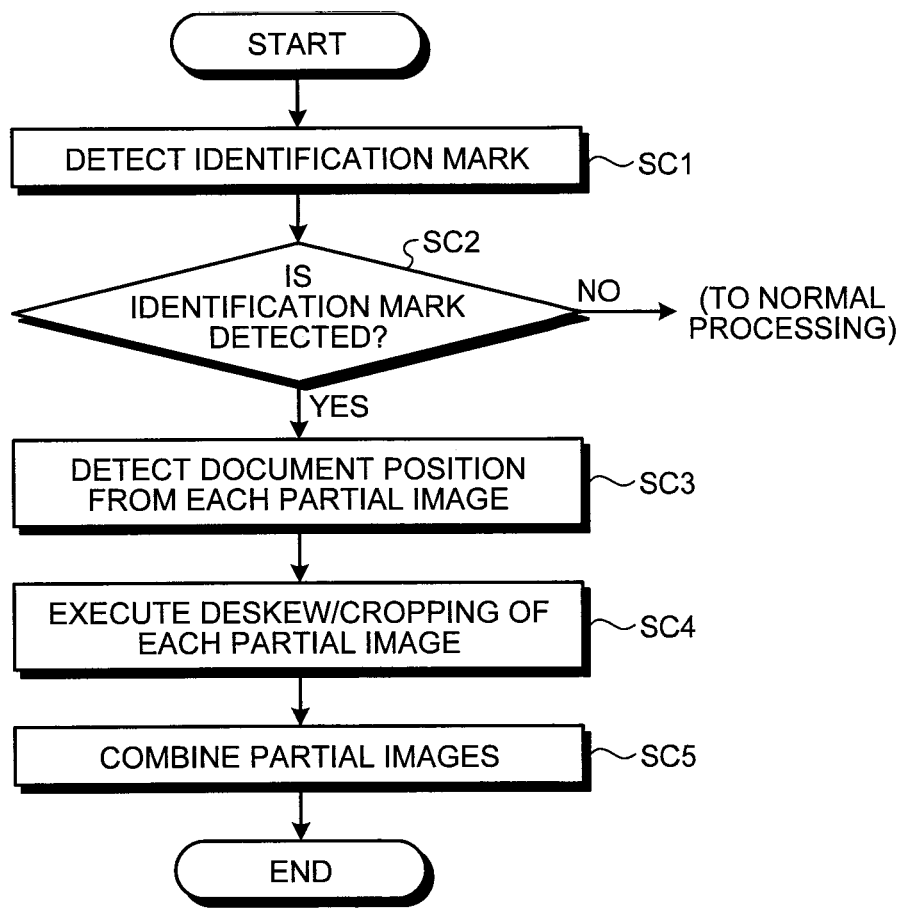
FIG. 12 is a flowchart showing an example of combining processing.

The combining processing of the partial images may also be performed in accordance with a flowchart shown in FIG. 12. FIG. 12 is a flowchart showing an example of the combining processing. Here, an example of the combining processing in which the identification mark MD is inserted into the document MA and used as shown in FIG. 11 will be explained.

First, the mark detecting unit 102f detects the identification mark MD from a partial image $MAI_L$ including the left portion $MA_L$ or from a partial image $MAI_R$ including the right portion $MA_R$ (step SC1). Specifically, the mark detecting unit 102f detects whether there is a colored portion at the top of the partial image $MAI_L$ or the partial image $MAI_R$ and whether the portion is located higher than the edge of the document MA by detecting the edge of the document and determining color.

When the identification mark MD can be detected at step SC1 (step SC2: Yes), the position detecting unit 102g detects the display position (area) of the document MA from the partial image $MAI_L$ and the partial image $MAI_R$ (step SC3). When the identification mark MD cannot be detected at step SC1 (step SC2: No), the combining processing ends and the process moves to predetermined normal processing.

Next, the deskew/cropping executing unit 102h detects the edges of the document MA from the partial image $MAI_L$ and the partial image $MAI_R$ on the basis of the display position (area) detected at step SC3, and executes any one or both of the deskew (tilt correction, distortion correction) and the cropping (cutting out) on the partial image $MAI_L$ and the partial image $MAI_R$ (step SC4). When executing the cropping, the deskew/cropping executing unit 102h cuts off a portion corresponding to the identification mark MD from the partial image $MAI_L$ and the partial image $MAI_R$.

The combining unit 102e combines the partial image $MAI_L$ and the partial image $MAI_R$ on which any one or both of the deskew and the cropping have been executed at step SC4 while the edge on the side of the identification mark MD is used as the junction line, and generates the combined image MAI thereof (step SC5).

3. Summary of the Embodiment and Other Embodiments

According to the embodiment, the message that notifies the arrangement position of the partial document having been read and the arrangement position of the partial document to be read next time is outputted on the monitor 114 in accordance with the predetermined notification sequence of the arrangement positions, the image area MB2 of the document display screen MB is divided, and the image of the partial document read by the scanner 200 is arranged in the arrangement position notified by the message and outputted to the monitor 114. In this way, the user can more easily understand how the scanner 200 reads the document. It is possible to cause the user to read the partial document to be read next time without error. It is possible for the user to easily recognize the partial document to be read next time. When the scanner 200 sequentially reads portions of the document, the reading processing can be made more easily understandable for the user. Specifically, it is possible to display the image of the portion having been read on the image area, and indicate the portion to be read next time by displaying a blank image to the user. It is possible to indicate the portion to be read next time to the user by the message (or a blinking sign, an icon, etc.). The images of the document that are read sequentially can be automatically outputted in appropriate positions in the image area.

According to the embodiment, when the Cancel button MB4 in the document display screen MB is pressed, the images of the partial documents are discarded, and when the End button MB3 is pressed, the images of the partial documents are stored in the image data file 106a. In this way, even when not all the partial documents have been read, it is possible to perform any one or both of the cancellation and the end of the reading of the document in the middle of the processing. It is possible to cause the user to select any one or both of the cancellation and the end of the reading of the document at any timing, and the images of the partial documents having been obtained can be appropriately processed while reflecting user's intention. While the documents are being read sequentially, it is possible to issue the end or cancel instruction of the reading processing. Specifically, every time the end or cancel instruction of the reading processing is issued from the user, the image of the document having been obtained can be appropriately processed.

According to the embodiment, when the A3 combining is performed by using the scanner 200, the image area MB2 of the document display screen MB is divided, and the image of the partial document having been read is shifted to an appropriate position and displayed. Specifically, according to the embodiment, when the A3 combining is performed by using the scanner 200, how the scanner 200 reads the document (to be more precise, whether the scanner 200 reads the front surface or the back surface of the document) is notified via the user interface. In this way, the user can easily check how the folded document is read by the scanner. In other words, it is possible to provide the image processing apparatus that is more easily understandable to users.

According to the embodiment, when the document, which is inserted into the carrier sheet MC that is formed so that the fold line of the document can be detected, is read by the scanner 200, (1) it is determined whether the sheet image includes the right portion or the left portion of the document by determining the fold line from the sheet image of the carrier sheet MC, and (2) when the sheet image includes the left portion, the sheet image is displayed in the left half of the image area MB2 in the document display screen MB, and when the sheet image includes the right portion, the sheet image is displayed in the right half of the image area MB2. In this way, the read image can be appropriately displayed while reflecting the actual position (left or right) of the read image in the document. It is possible to automatically determine the display position by using the carrier sheet in which the document is inserted, and automatically output the image of the document in an appropriate position in the image display area. According to the embodiment, when it is determined that the carrier sheet is not used, the partial image can be appropriately displayed in a display range without automatically dividing the image area of the document display screen. In this way, the image of the document can be outputted appropriately in the image area as an independent single image read in a normal read mode without dividing the image area.

According to the embodiment, the characteristic identification mark (for example, the sticky note such as the Post-it (registered trademark), the bookmark, the tag label) is inserted into the folded document, the identification mark is automatically detected from the partial images, and the partial images are combined. Specifically, (1) it is detected whether there is the colored portion at the top of the partial image and further whether the portion is located higher than the edge of the document by detecting the edge of the document and determining color, (2) the edges of the document are detected and the deskew/clopping processing is performed on the partial image (top mark at the upper end is cut off), and (3) combining processing is performed on the partial images on which the deskew/clopping processing is performed. In this way, it is possible to solve the problems, such as, a large carrier sheet needs to be used as the carrier sheet and it takes some time to set the carrier sheet, in the conventional method in which a carrier sheet is used to perform the combining processing of a large-sized document such as an A3-sized document. Also, in the conventional method in which a setting is switched to perform the combining processing of the large-sized document such as the A3-sized document, it is possible to solve the problems, such as, the setting needs to be switched, the switching operation may be forgotten, and it is not known which side should be the junction line of the document when performing the read operation. When using the identification mark, the scanner is preferable to have hardware features, such as, the folded document can be read (the scanner does not have a separation mechanism), and read sensors are arranged at a interval narrower than a width of the identification mark so that the scanner can read the identification mark having a narrow width.

By setting (inserting) the identification mark along the fold line of the document, the direction of the fold line of the document can be automatically determined from the partial image. In other words, by only setting the identification mark, the direction of the fold line of the document can be automatically detected from the partial image. Specifically, it is possible to automatically determine the display position by using the identification mark inserted into the document, and automatically output the image of the document in an appropriate position in the image area.

When using a sticky colored paper medium such as the Post-it (registered trademark) as the identification mark, even when the identification mark is lost, there is a replacement. Therefore, it is possible to solve the problem, such as, the carrier sheet may be lost, in the conventional method in which the carrier sheet is used to perform the combining processing of the large-sized document such as the A3-sized document.

When using a carrier sheet with a small identification mark, the carrier sheet itself can be small. Therefore, a document that is desired not to be damaged (for example, photograph) can be read by inserting it into the carrier sheet. Since the carrier sheet itself can be small, in a use as a mobile apparatus, it is convenient when carrying the apparatus. Even when the identification mark is lost, the combining processing can be performed by printing the same identification mark and inserting the identification mark into the document.

Further, the present invention may be implemented in various different embodiments other than the embodiment described above within a technical scope described in claims. For example, in the embodiment, although a case in which the image processing apparatus 100 performs the processing as a standalone apparatus is explained as an example, a configuration is possible in which the processing is performed in accordance with a request from a client terminal having a housing separate from the image processing apparatus 100 and the processing result is returned to the client terminal. In the processing items explained in the embodiment, all or part of the processing items explained to be performed automatically can be performed manually, or all or part of the processing items explained to be performed manually can be performed automatically by a publicly known method. Specific forms of distribution and integration of the apparatuses are not limited to those illustrated in the figures, and all or part of the apparatuses can be functionally or physically distributed or integrated in arbitrary units according to various additions or functional loads. The processing procedures, control procedures, specific names, screen examples, and the like described in this description and the figures can be arbitrarily changed unless otherwise stated.

Regarding the image processing apparatus 100, the constituent elements shown in the figure are functionally conceptual, and need not necessarily be physically configured as shown in the figure. For example, all or part of the processing functions included in the devices in the image processing apparatus 100, in particular, the processing functions performed by the control unit 102 may be realized by the CPU and a program read and executed by the CPU, or may be realizes as hardware by wired logic. The program is recorded in a recording medium described below, and mechanically read by the image processing apparatus 100 as necessary. Specifically, a computer program for providing commands to the CPU and performing various processing in cooperation with the OS is recorded in the storage unit 106 such as ROM or HD (Hard Disk). The computer program is loaded into RAM to be executed, and constitutes the control unit in cooperation with the CPU. The computer program may be stored in an application program server connected to the image processing apparatus 100 via any network, and all or part of the computer program can be downloaded if needed. Various databases or the like (the image data file 106a) stored in the storage unit 106 are storage means including a memory device such as RAM and ROM, a fixed disk device such as a hard disk, a flexible disk, an optical disk, and the like, and store various programs, tables, databases, web page files that are used for various processing and for providing data to web sites.

The image processing apparatus 100 may be configured as an information processing apparatus (including an information processing apparatus to which any peripheral devices are connected) such as a known personal computer and a workstation. The image processing apparatus 100 may be realized by installing software (including a program, data, and the like) that realizes the image processing method according to the present invention in the information processing apparatus. The image processing program according to the present invention may be stored in a computer-readable recording medium, and can be configured as a program product. Here, the "recording medium" includes any "portable physical medium" such as a flexible disk, an optical magnetic disk, ROM, EPROM (Erasable Programmable Read Only Memory), EEPROM (Electronically Erasable and Programmable Read Only Memory), CD-ROM (Compact Disk Read Only Memory), MO (Magneto-Optical disk), and DVD (Digital Versatile Disk), or a "communication medium" that holds the program temporarily, such as a communication line and carrier waves, in the case of transmitting the program through a network typically represented by a LAN (Local Area Network), a WAN (Wide Area Network), and the Internet. The "program" is a data processing method described in any language or description method, and any format is possible such as source code and binary code. The "program" is not limited to a program configured as a single program, but includes a program configured as a plurality of modules or libraries in a distributed configuration, and a program that achieves its function by cooperating with a different program represented by the OS. Regarding a specific configuration and a reading procedure to read the recording medium in each apparatus shown in the embodiment, or an installation procedure after the reading, or the like, a widely known configuration and procedure can be used.

According to the present invention, the control unit arranges the image read by the reading processing in an area shifted in a certain direction in the display area in which the read image on which the reading processing is performed by the image reading apparatus is displayed, and outputs the image to the output unit. In this way, when the image reading apparatus sequentially reads portions of the document, there is an advantage that the reading processing can be made more easily understandable for the user. Specifically, there is an advantage that it is possible to display the image of the portion having been read on the image display area, and indicate the portion to be read next time by displaying the blank image to the user.

According to the present invention, the control unit arranges the image read by reading processing next to the reading processing in a remaining area of the display area, and outputs the image to the output unit. In this way, there is an advantage that the images of the document that are read sequentially can be automatically outputted in appropriate positions in the image display area.

According to the present invention, the control unit outputs the notification information indicating the read position read by the reading processing or the notification information indicating the reading processing to be performed next time to the output unit. In this way, there is an advantage that the portion to be read next time can be indicated to the user by the message, the blinking sign, the icon, and the like.

According to the present invention, the control unit performs any one or both of the end and the cancellation of the reading processing. In this way, there is an advantage that the end instruction or the cancel instruction can be issued while the documents are being read sequentially.

According to the present invention, when the document on which the reading processing is performed is read by the image reading apparatus along with the carrier sheet on which the mark is provided, the control unit determines the arrangement position of the document on the basis of the mark in the image of the document, arranges the image read by the reading processing in the determined arrangement position, and outputs the image to the output unit. In this way, there is an advantage that it is possible to automatically determine the display position by using the carrier sheet in which the document is inserted, and automatically output the image of the document in an appropriate position in the image display area.

According to the present invention, when the mark cannot be detected, the control unit arranges the image read by the reading processing in the entire display area, and outputs the image to the output unit. In this way, there is an advantage that the image of the document can be outputted appropriately in the image display area as the independent single image read in the normal read mode without dividing the image display area.

According to the present invention, when the document is read by the image reading apparatus along with the identification mark, the control unit detects the identification mark from the image of the document, and when the identification mark can be detected, the control unit detects the display position of the document in the image of the document from the image of the document, arranges the image read by the reading processing in the determined display position, and outputs the image to the output unit. In this way, there is an advantage that it is possible to automatically determine the display position by using the identification mark inserted into the document, and automatically output the image of the document in an appropriate position in the image display area.

According to the present invention, the control unit executes any one or both of the deskew (tilt correction, distortion correction) and the cropping (cutting out) on the image of the document on the basis of the detected display position, and combines the images of the document on which any one or both of the deskew and the cropping have been executed. Here, when reading a large-sized document, there are the method that uses a carrier sheet and combines images, and the method that switches a setting and combines images. However, in the former method, there are problems, such as, a large carrier sheet needs to be used as the carrier sheet, the carrier sheet may be lost, and it takes some time to set the carrier sheet. In the latter method, there are problems, such as, the setting needs to be switched, the switching operation may be forgotten, and it is not known which side should be the junction line when performing the read operation. However, according to the present invention, since the images are combined by automatically detecting the identification mark inserted into the document, there is an advantage that all the problems in the conventional methods can be solved.

According to the present invention, when the document on which the reading processing is performed is read by the image reading apparatus along with the carrier sheet on which the mark is provided, the control unit determines which portion of the document is read on the basis of the mark in the image of the document, and outputs the notification information indicating the read position to be read next time to the output unit on the basis of the determination. When the document on which the reading processing is performed is read by the image reading apparatus along with the identification mark, the control unit detects the identification mark from the image of the document, determines which portion of the document is read from the image of the document when the identification mark is detected, and outputs the notification information indicating the read position to be read next time to the output unit on the basis of the determination. In this way, when the image reading apparatus sequentially reads portions of the document, there is an advantage that the reading processing can be made more easily understandable for the user. Specifically, there is an advantage that the portion to be read next time can be indicated to the user by the message, the blinking sign, the icon, and the like.

According to the present invention, when the image reading apparatus sequentially reads portions of the document, the control unit discards the image read by the reading processing when the cancel instruction of the reading processing is issued, and stores the image read by the reading processing in the storage unit when the end instruction of the reading processing is issued. In this way, when the image reading apparatus sequentially reads portions of the document, there is an advantage that the reading processing can be made more easily understandable for the user. Specifically, there is an advantage that the end or cancel instruction can be issued while the documents are being read sequentially. Also, specifically, there is an advantage that the image of the document having been obtained can be appropriately processed every time the end or cancel instruction of the reading processing is issued from the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
a control unit and an output device, wherein
the control unit includes
a mark detecting unit that, when a document on which reading processing is performed is read by an image reading apparatus along with an identification mark, detects the identification mark from an image of the document read; a position detecting unit that, when the identification mark is detected by the mark detecting unit, determines which portion of the document is read from the image of the document; and
a notification output unit that outputs notification information indicating a read position to be read next time to the output device on the basis of which portion of the document is read as determined by the position detecting unit, wherein
the identification mark is inserted at a top edge of the document along a document fold line, outside the document area and
the identification marks is identified based on color and/or pattern.

2. The image processing apparatus according to claim 1, wherein the control unit further includes an image output unit that arranges an image read by the reading processing in an area shifted in a certain direction in a display area for displaying a read image on which the reading processing is performed by the image reading apparatus, and outputs the image to the output device.

3. The image processing apparatus according to claim 2, wherein the image output unit arranges the image read by a next reading processing in a remaining area of the display area, and outputs the image to the output device.

4. The image processing apparatus according to claim 2, wherein
the position detecting unit detects a display position of the document in the image of the document from the image of the document when the identification mark is detected by the mark detecting unit, and
the image output unit arranges the image read by the reading processing in the display position determined by the position detecting unit, and outputs the image to the output device.

5. The image processing apparatus according to claim 1, wherein, the control unit further includes a read control unit that performs any one or both of an end and a cancellation of the reading processing.

6. The image processing apparatus according to claim 5, further comprising a storage unit that stores the image read by the reading processing of the image reading apparatus, wherein
the read control unit issues any one or both of an end instruction and a cancel instruction of the reading processing, and
when the image reading apparatus sequentially reads portions of the document, the read control unit discards an image read by the reading processing when the cancel instruction is issued, and stores an image read by the reading processing in the storage unit when the end instruction is issued.

7. The image processing apparatus according to claim 1, wherein the control unit further includes
a deskew/cropping executing unit that executes any one or both of deskew and cropping on the image of the document on the basis of the display position detected by the position detecting unit, and
a combining unit that combines the images of the document on which any one or both of deskew and cropping have been executed by the deskew/cropping executing unit.

8. An image processing method performed in a control unit of an image processing apparatus, the apparatus including the control unit and an output device, the method comprising:
a mark detecting step of, when a document on which reading processing is performed is read by an image reading apparatus along with an identification mark, detecting the identification mark from an image of the document;
a position detecting step of, when the identification mark is detected at the mark detecting step, determining which portion of the document is read from the image of the document; and
a notification output step of outputting notification information indicating a read position to be read next time to the output device on the basis of which portion of the document is read as determined at the determining step or the position detecting step, wherein
the identification mark is inserted at a top edge of the document along a document fold line, outside the document area and
the identification marks is identified based on color and/or pattern.

9. A non-transitory computer-readable recording medium including programmed instructions for image processing, the instructions, when executed by a control unit of an image processing apparatus, the apparatus including the control unit and an output device, causing the control unit to perform:

- a mark detecting step of, when a document on which reading processing is performed is read by an image reading apparatus along with an identification mark, detecting the identification mark from an image of the document read;
- a position detecting step of, when the identification mark is detected at the mark detecting step, determining which portion of the document is read from the image of the document; and
- a notification output step of outputting notification information indicating a read position to be read next time to the output device on the basis of which portion of the document is read as determined at the determining step or the position detecting step, wherein
- the identification mark is inserted at a top edge of the document along a document fold line, outside the document area and
- the identification marks is identified based on color and/or pattern.

\* \* \* \* \*